Fig. 1

INVENTORS
ROBERT E. FEARON
JEAN M. THAYER

July 28, 1959

R. E. FEARON ET AL 2,897,372

DIRECTIONALLY SENSITIVE SHALLOW IONIZATION
CHAMBERS FOR NEUTRON WELL LOGGING

Original Filed July 30, 1949

*INVENTORS*
ROBERT E. FEARON
JEAN M. THAYER

BY

Robert K. Schumacher

ATTORNEY

INVENTORS
ROBERT E. FEARON
JEAN M. THAYER
BY
Robert K. Schumacher
ATTORNEY

United States Patent Office 2,897,372
Patented July 28, 1959

2,897,372

DIRECTIONALLY SENSITIVE SHALLOW IONIZATION CHAMBERS FOR NEUTRON WELL LOGGING

Robert E. Fearon and Jean M. Thayer, Tulsa, Okla., assignors to Well Surveys, Inc., a corporation of Delaware Original application July 30, 1949, Serial No. 107,806, now Patent No. 2,712,081, dated June 28, 1955. Divided and this application April 19, 1954, Serial No. 423,971

11 Claims. (Cl. 250—83.6)

This invention relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances. This is a division of our copending application, Serial No. 107,806, filed July 30, 1949, now Patent No. 2,712,081 for a Method and Apparatus for Neutron Well Logging.

This invention is directed to the solution of a problem which has been long recognized by geologists and geophysicists, and by others, confronted with the problem of locating valuable substances, such as petroleum, in the sub-surface formations of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as far as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the subsurface formations of the earth include: electrical methods which involve the measurement of self-potential, conductivity, and resistivity; thermal methods; seismic methods which treat of the acoustical properties of the subsurface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

For the purpose of particularly describing and setting forth the respects in which this invention differs from and represents advancement upon the prior art, there is set forth a description of the efforts of previous workers insofar as they have been directed to the problem which has been stated in the previous paragraph.

The location of petroleum has been attempted by various well logging methods which are sensitive to some physical characteristic imparted to the rocks by the presence of petroleum in them. For example, resistivity methods in combination with other methods somewhat ambiguously enable detection of petroleum. The inconvenience and uncertainty of the use of resistivity methods arise from the fact that resistivity is a general property of rocks, and is possessed by some rocks not containing petroleum to an even greater extent than the degree to which the property is manifested by certain other rocks full of petroleum. For example, Indiana limestone will be found to have a much higher resistivity than oil saturated sandstone of the Frio formation in the gulf coast oil fields. Furthermore, sandstone which contains natural gas, has a high resistivity, as does also coal. Moreover, limestone may show a decrease of resistivity where an oil bearing horizon appears. It could similarly be shown how each and every one of the other non-nuclear logging methods have specific shortcomings which analogously prevent them from being or amounting to a specific recognition of petroleum.

The instant invention provides a complete solution to the above problem. This solution consists of a system of observations by which the operator is enabled to recognize and quantitatively measure nuclear species of the subsurface formations adjacent a bore hole. Although the desired substances quite often are not elements or single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Among the means which are required for the solution of the above problem, there is provided exceedingly powerful and energetically efficient monoenergetic neutron sources, relying upon the nuclear reactions caused by electrical or electromagnetically accelerated particles. These are provided in a form which is adapted to be lowered into a bore hole, and employed therein to bombard the rocks adjacent to the bore hole. Also required for the practice of this invention are powerful capsuled neutron-emitting sources, depending for their operation upon energetic particles emitted by radioactive substances. There is set forth the manner of choosing and designing such neutron-emitting sources, showing how a person skilled in the art can avail himself of intensities hundreds of times greater than those which are now available.

Required in the practice of this method are various means of observing neutrons which permit the determination of the energy, the direction of incidence of neutrons, and the sense of direction.

Among these means, there are provided devices which determine both energy and direction of incident neutrons within certain limits. There is also provided a device for detecting phenomena described in nuclear physics as n-p reactions. This device enables exact determination of energy of neutrons, and a somewhat ambiguous determination of direction. Incidental to the practice of this invention also is a device for resolving nuclear data which gives only a general indication of energy, and interpreting this general indication of the energy of neutrons in a more exact way. There is also provided, as a means of practicing this invention, a choice of the manner of employment of a number of neutron filters adapted to select specific energy groups of neutrons. It is shown how these filters may be employed for the purpose of identifying specific elements in the strata.

Therefore the primary object of this invention is the provision of a method and apparatus for identifying valuable substances by separately measuring the influence of specific properties of the nuclei of the valuable substances upon a flux of fast neutrons.

Another important object of this invention is the provision of a method and apparatus whereby petroleum can be positively identified in the subsurface strata adjacent a bore hole.

This invention also contemplates a method and means for locating valuable substances situated in difficultly accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lie in a predetermined range, and recording their time-rate of occurrence versus depth.

Another object is to provide means for delivering to a recorder electrical signals which denote the intensity of neutrons of a definite energy class.

This invention also contemplates means for determining specific energy losses in samples of substances exposed to neutrons of a determined energy for the purpose of adjusting energy selective neutron detector systems used in well logging.

Another object is to provide a method and means to accomplish deep investigation in a direction perpendicular to a bore hole and concurrently provide very detailed resolution of thin strata.

Still another object is to provide detectors which are directionally sensitive and which are adjusted with respect to the source for favorable angle of fast neutron scattering from formation substance that are capable of determining variations of the properties of strata with distance horizontally.

This invention also contemplates a novel detector whereby dip determinations can be made in a drill hole.

Another object of this invention is to provide a detecting system whereby horizontal anisotropy can be detected.

Still another object is to provide means for detecting horizontal anisotropy in a measurement based upon a particular energy of neutrons.

A further object is to provide a detecting system whereby vertical direction sensitivity and sense of direction of neutrons of a particular energy can be detected.

Other objects and advantages of the present invention will become apparent from the following detailed description when considered with the drawings, in which.

As pointed out above, consideration of the problem of well logging has led to the conclusion that there is a necessity for the discovery of methods which will identify more specifically the substances found in the rocks adjacent to wells which are logged. Specific identifying properties, which could be relied upon as a means of recognition of substances, must be able to cause an effect which is observable under the logging conditions which prevail. Preferably the process making the observations possible should be one which acts through space and through matter which fills the space between the position in which the rock to be identified is found, and the location of the detecting apparatus in the bore hole. The necessity for action through space arises because of the prevalence of casing and/or cement and/or fluid of various sorts which commonly exist in the well bores, and which interfere with the measuring process. Another reason why considerable action through space is essential is the need for the depth of investigation to be adequate. Considerable depth of investigation is a highly desirable factor in well logging because of the heterogeneity of rocks making shallow observations unrepresentative, and therefore inaccurate as a representation of the whole mass of rock penetrated.

There are available at the present time only a very few types of influences by which desirable observations as discussed above may be made. Obviously, the magnetic and electric fluxes are not available for consideration in connection with cased wells, and the electric flux is unusable when investigating non-conducting material. The observation of the heat flux is familiar in the art of well logging and has patently the disadvantage that such observations are slow if one desires a considerable depth of investigation. The transmission of observable infrared and ultraviolet radiations is excluded because of the opacity of substances generally present in the earth and in bore holes. The gravitational flux has satisfactory properties, and, in principle, could be measured. But no known means of measuring it for well logging purposes has been found.

In attacking the above problem, seeking for a method of specific recognition of material in the circumstances of a bore hole penetrating the rock strata of the earth, it has been discovered that there are apparent specific properties of atomic nuclei corresponding with energy transitions in those nuclei. These transitions may evidence themselves in a variety of ways, such as:

(a) The emission of radiant energy through space.

(b) The absorption of a particular amount of energy from a bombarding particle or quantum.

(c) A specific energy threshold or a plurality of energy thresholds of susceptibility of the nuclei to certain classes of nuclear change, which may be caused by bombarding corpuscles or quanta.

It has been discovered that in all branches of molecular, atomic, and sub-atomic physics, one may generally predict that if a specific energy transition is possible in a quantized system, there will be a resonance effect, specifically affecting bombarding particles or quanta possessing energy (either kinetic or potential) in the close vicinity of the amount required to produce a quantized transition. The discovery of the details of quantization of nuclei of atoms waits still for extensive experimental and theoretical work. Limited experimental evidence has already brought support to the conviction which exists in the minds of all nuclear physicists to the effect that nuclei will surely be found to be quantized systems. In some instances energy thresholds of various kinds have already been determined for nuclei. For example, the photo-neutron threshold is now known experimentally through the study of its inverse process, capture, by Kubischek and Dancoff.

A specific energy threshold at 20 megavolts has been found for the system comprising 4 nucleons (2 protons and 2 neutrons). Sundry isomeric transitions corresponding with highly forbidden transformations of the arrangements of nucleons have been found experimentally and can be considered as additional evidence of the truth and experimental significance of the general conclusion that nuclear matter exists in quantized energy states.

In an effort to make use of the foregoing general conclusion, it has been discovered that only two classes of radiation appear to exist which react with nuclear matter appreciably and can be arranged conveniently for the observation of quantized energy levels of nuclei. These classes of radiation are the photon or electromagnetic class, and the corpuscular class comprising neutrons. Other particles (charged) in general do not penetrate the coulomb field of force surrounding a nucleus at energy falling in the range of possible excitation processes of common nuclei. Such excitation processes are typically expected for light nuclei in the vicinity of 1 million electron volts.

Charged particles lack action through a distance as defined herein. Therefore, corpuscular radiations of the charged variety would, in principle, not be particularly useful for investigation of the quantized levels of nuclei. Of the classes of radiation which have been suggested, the only one which has been discovered which has a favorable ratio for the amount of interaction which it undergoes with nuclear matter, as compared with the energy transitions effected in the progress of the radiation by circumstances arising outside the nuclei of atoms, is the neutron. The photon reacts extensively with orbital electrons, and has only a very small cross section (target probability) for interactions with nuclei as such. There is furthermore an additional reaction of photons which becomes prominent above 2 electron megavolts, and which, in the range above 2 electron megavolts results in materialization of electron-positron pairs. This materialization, though influenced by the presence in the near vicinity of the nuclear field of force, does not represent a specific or identifying characteristic of particular nuclei, but is a general characteristic of all nuclei, more prominent for the nuclei of heavy elements like lead and less prominent for the nuclei of light elements such as aluminum. For the above listed reasons, there appear to be only a few especially simple reactions caused by photons which might be of any use. One might find it desirable to observe the neutrons released from nuclei by photons, since there is, for such nuclear photo-neutrons, a specific threshold of energy for each nuclear species (element or isotope thereof). One might also investigate the "unmodified" Compton scattering of energetic photon radiations in the hope of finding some slightly modified lines which suffered loss of energy by interaction with nuclei. This possibility is somewhat favored by the fact that the otherwise much stronger modified Compton scattering radiation is rapidly eliminated from the flux by absorption.

On the other hand, the interaction of neutrons with the outside parts of the atom is so small that the direct production of ion-pairs by neutrons is found to occur on an average of only about one time per meter of ordinary atmospheric air for a neutron possessing a kinetic energy of five million electron volts. The liberation of energy by neutrons in air therefore amounts to less than one thousandth of 1% per meter of air traversed, for energy liberated by processes involving the outside portions of the atoms found in the air. A distance of travel in air which would result in an average loss of energy by reaction with outside parts of the atoms of less than 1%, would, nevertheless, result in total absorption of the neutrons, and all their energy, by reaction with the nuclei of the atoms contained in air. Even so, many of the reactions which neutrons undergo, which occur between neutrons and nuclei of the matter, are not highly specific, nor do they aid in any refined efforts to identify such matter. Among the unidentifying nuclear reactions one may name, for example, conservative ballistic nuclear scattering of neutrons, that is, conservative of total kinetic energy. This process is specifically different to an extreme degree only in the case of very light elements such as hydrogen and helium. The average nature of other matter contained in the rocks is sufficiently alike in this respect that the main possibility of use of the property of conservative ballistic nuclear scattering of neutrons is to observe differences in the propagation of neutrons through the rock which enable conclusions regarding the presence of hydrogen to be made. This effect is already made use of, and there exist a considerable number of U.S. patents and other published descriptions bearing on this subject. Among these patents are No. 2,308,361, No. 2,220,509, and No. 2,349,712. The broad class under which these previously named inventions fall corresponds with a patent issued to John C. Bender, No. 2,133,776.

The theory of detection of hydrogen by conservative ballistic nuclear scattering is treated in an article written by Robert E. Fearon and published in the June 1949, issue of Nucleonics, entitled "Neutron Well Logging."

Figure 1:
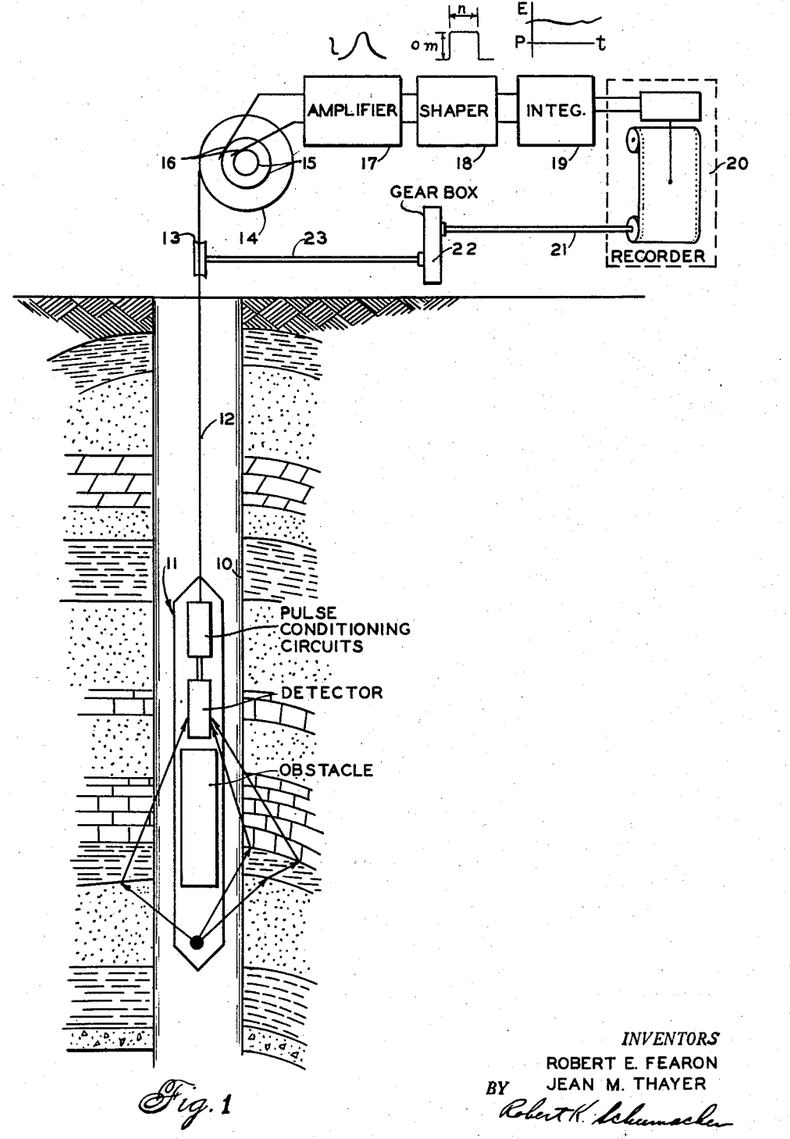
Figure 1 is a schematic illustration of a well logging operation showing the surface recording system.
Figure 2:
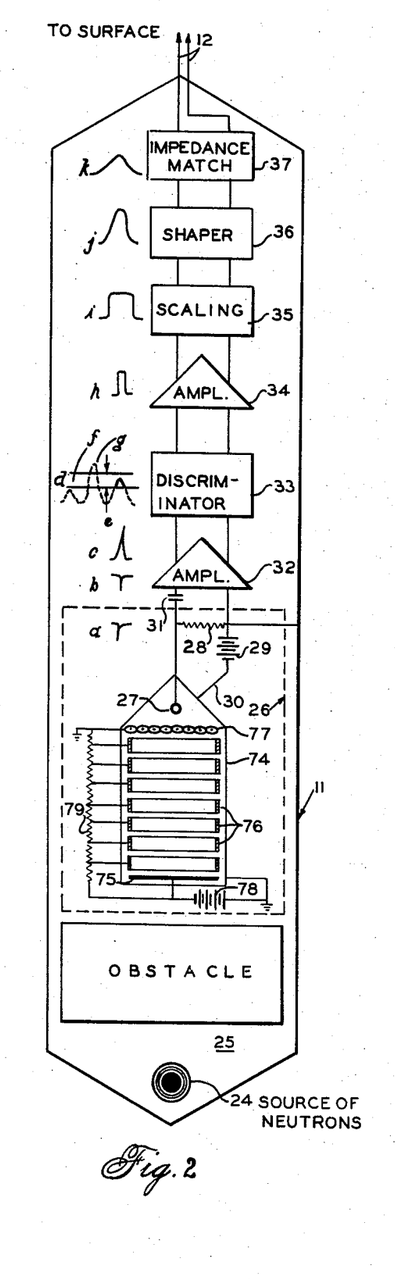
Figure 2 is a diagrammatic illustration of a subsurface instrument with the detector illustrated in vertical section.

The above theory finds general application in pursuing this method, and Figures 1 and 2 more particularly set forth the details of arrangements through which these general concepts find specific application to the problem set forth above.

Referring to these figures there is illustrated an application of this invention to a well surveying system. In Figure 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill hole 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 to the measuring wheel 13. The gear box 22 has adjustments to enable suitable choice of depth scales.

Referring specifically to Figure 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials or left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplified pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to an amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35, which, in a known manner, delivers pulses as illustrated at $i$, the number of which occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries or rectified alternating current. Batteries which very satisfactorily fulfill the temperature requirements in hot wells are the zinc, potassium hydroxide, mercuric oxide cells.

Figure 3:
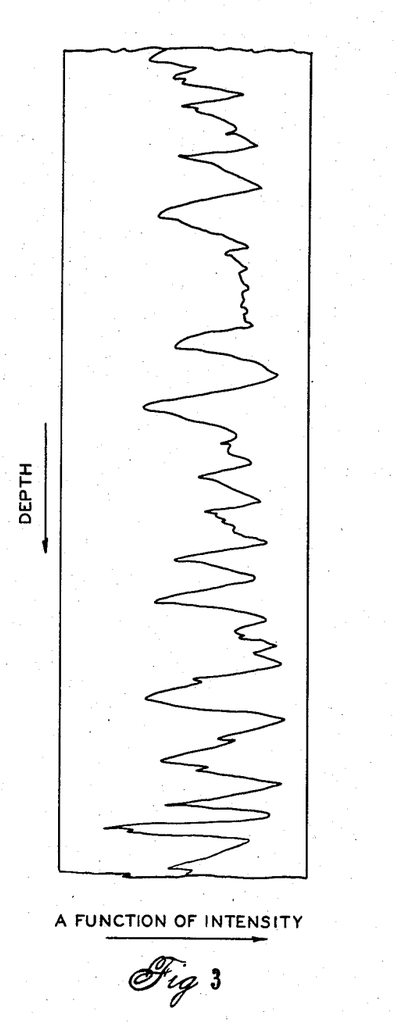
Figure 3 illustrates the type of well log that would be produced by the present invention.

Again referring to Figure 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form with a fixed height $m$ and fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in Figure 3. This curve has as its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate, or be especially sensitive to, the presence of a particular substance in the region adjacent the bore hole.

Although no power supply has been shown in connection with the surface apparatus, it is to be understood that it will be powered in a conventional manner such as was pointed out in connection with the subsurface apparatus.

As can be understood from previous parts of this application, it is an object of this invention to measure only certain parts of an otherwise less informative flux of scattered, diffused, or partially absorbed flux of neutrons, and to use data concerning the intensity of these dissected portions of the neutron flux as a means of obtaining more specific information regarding the nature of the substance by which the primary neutron flux is diffused, scattered or absorbed. Quite naturally, therefore, it may be seen that the measurement proposed herein is more difficult in certain particulars than those called for by the discoveries of the prior art. For example, the requirement that there be, within the interval of time in which a measurement is performed, a statistically sufficient number of processes to produce an accurate observation of the average rate of occurrence of such processes, will be less satisfactorily met. This conclusion is derived from the proposition that this discovery concerns itself in each instance with a measurement of only a part of the neutron radiation. Probable error in the measurement of any radiation is decreased when adequate intensity prevails, the percentage probable error in general being inversely proportional to the square root of the intensity. For illustration, therefore, if there are neutrons composing an energy spectrum uniformly distributed from zero to five million electron volts, and it is desired to observe that portion of the energy spectrum lying between three thousand four hundred electron kilovolts, and three thousand five hundred electron kilovolts, the percentage probable error of such a measurement will be approximately seven times worse than it would be if the measurement had used all the neutrons. It follows, therefore, that strong fluxes of neutrons are needed to practice this well logging method. It likewise follows that, if the neutrons are to be undirected, there is need that they be generated in some isotropic nuclear process.

Figure 4:
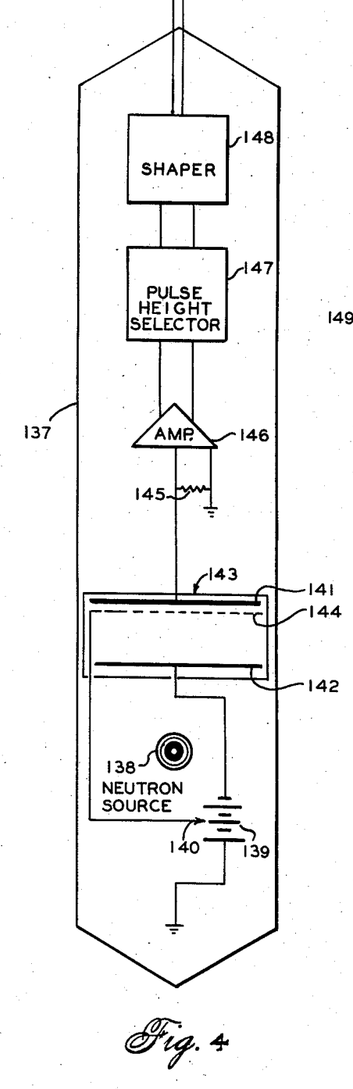
Figure 4 is a diagrammatic illustration of a well logging system employing a novel type of detector, and a novel detector-source arrangement.

Another form of the instant invention is illustrated diagrammatically in Figure 4. This form of the invention is adapted to measure hydrogen content of the formations adjacent a drill hole. The measurement is effected by detecting maximum energy neutrons entering a special detector substantially perpendicularly to the axis of the instrument after they have been emitted by a source vertically spaced a short distance from the detector, entered the formations, and rebounded from relatively massive nuclei therein. These energetic processes which are measured are those which correspond with neutrons entering the special detector, making a substantially square hit on a helium (or hydrogen) nucleus in the detector, and causing the recoiling nucleus to be so directed in the detector, that it dissipates its entire energy in the ionizable medium therein, along a path transverse to the axis of the instrument. Neutrons, which are detected are, for square hits, collinear with the recoil paths they cause. Therefore, the special detector, as used herein, is quite accurately directional and will be sensitive only to neutrons of maximum energy, incident perpendicularly to the axis of the instrument.

It has been made certain that this directional sensitivity will prevail by selecting the shape of the gas space in the detector between its walls so that long recoil paths can only exist perpendicular to the axis.

Neutrons which have maximum energy cannot have rebounded but very few times from atoms in the strata, because those which have rebounded more times will generally not have retained maximum energy. For simplicity, consider a maximum energy neutron which has left the source substantially perpendicularly to the axis of the instrument, and has rebounded in a suitable direction to enter the detector. Such a neutron can retain approximately its total energy, only if the atom it struck in rebounding was not hydrogen. Neutrons striking hydrogen nuclei under the above circumstances will have lost nearly all of their energy. Hydrogen will, therefore, be very specifically measured because it will produce a deficiency of returned energetic neutrons, compared with the intensity which is returned from similar strata not containing hydrogen.

Referring particularly to Figure 4 for a description of the apparatus, there is shown a housing 137 that has been designed for operation in a drill hole in which high pressures are encountered. Housing 137 contains, in its lower part, a source of neutrons 138, a battery 139 and a variable connection thereto indicated as 140. Battery 139 serves to place a potential on the electrodes 141 and 142 of the impulse ionization chamber 143. Electrodes 141 and 142 are disposed in an atmosphere of helium or hydrogen. These electrodes are in the form of discs which are axially spaced from each other an amount which is many times less than their diameter. In a practical well logging instrument the spacing between electrodes can be 1 cm. for a diameter of electrodes of 7 cm. and a helium pressure of approximately 7 atmospheres, or a hydrogen pressure of approximately 100 atmospheres.

In order to cause equal weighting of the influence upon the external circuit for electrons produced in the ionization chamber, there has been provided a screen 144. The screen 144 is connected to the variable tap 140 of the battery 139. The screen is so chosen that it is a practically perfect electrostatic shield for the electrode 141. This is accomplished, as is well known, by using screen having a spacing between its wires which is small compared to the distance between the screen 144 and the electrode 141. This arrangement results in equal weight being given all electrons which originate in the major part of the interior volume, that is, between screen 144 and electrode 142.

Except for screen 144, the electrode circuit includes electrodes 141 and 142, battery 139, the ground or casing 137, and resistor 145. Processes occurring within the ionization chamber 143 cause to be produced, across the resistor 145, pulses which may be amplified by the amplifier 146. Amplifier 146 is preferably one having a flat frequency response in the range of from 100 kilocycles to 10 megacycles. The amplified signals, or pulses, are fed into a pulse height selector 147. The output of this circuit is in turn conducted to a pulse shaper and impedance matching circuit, indicated by block diagram at 148. The impedance matching means are necessary in delivering to the transmission cable signals of suitable nature to be transmitted to the recording system located on the surface of the earth adjacent the mouth of the drill hole. It is to be understood that the recording system will have a pulse rate conversion circuit, such as has been described heretofore, connected therein.

Figure 5:
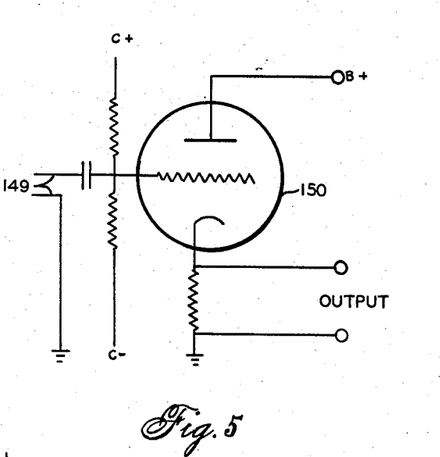
Figure 5 is a detailed wiring diagram illustrating the contents of one of the elements utilized in Figure 4.

The pulse height discriminator 147 may take the form illustrated diagrammatically in Figure 5. In this figure there is shown input conductors 149 which serve to conduct a signal to the grid of a vacuum tube 150, which is normally biased beyond cutoff, by an amount sufficient to reject all but the largest incoming pulse signals. Tube 150 has its output connected by means of a cathode follower to the succeeding circuit element 148.

Since the method and apparatus just described is a directed ray method of investigation, it is exceptionally well adapted to make deep investigations of very thin strata, without error being caused by the near presence of other and different strata above and below.

Figure 6:
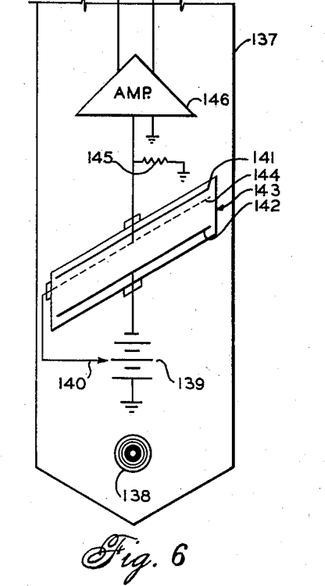
Figure 6 illustrates a modification of the detector shown in Figure 4.

A modification of that form of the invention described immediately above is shown in Figure 6. In this modification the ionization chamber 143 is shown having the planes of its electrodes disposed at a substantially acute angle to the axis of the instrument. This angle may be any angle desired which will align the space between the electrodes with the path of rebounding fast neutrons which it is desired to measure. In this figure, corresponding elements have the same reference characters. The electrical output circuit extending to the transmission cable may be the same as that utilized in connection with Figure 4.

The difference between the arrangement of Figure 4 and the arrangement of Figure 6 is that, by means of the Figure 6 arrangement it is possible to direct attention to the most favorable angles of scattering, at which the primary maximum energy neutrons of the source have the largest likelihood of being scattered by the nuclei of atoms present in the strata. Furthermore, since this favorable angle is realized only in the plane including the axis and the lowest part of the tilted ionization chamber, and only at the left of the axis in this plane, as shown in the figure, the arrangement of Figure 6 will be orientation sensitive in a bore hole, and may be used to investigate the strata lying in different geographic directions from the axis of the bore hole being investigated. The device in Figure 6 may, therefore, be used in conjunction with orientation means known in the art, to determine transverse variations in properties of strata penetrated by a bore hole, and to determine the geographic direction of these variations.

Figure 7:
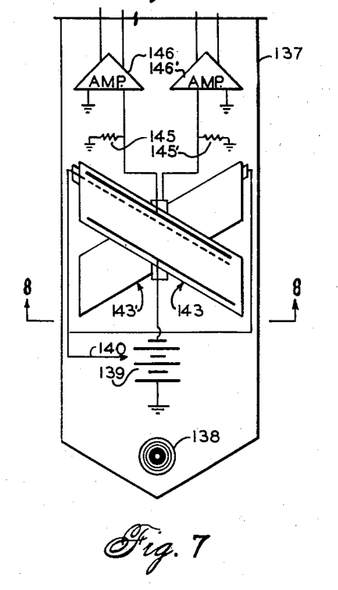
Figure 7 illustrates still another modification of the detector shown in Figure 4.
Figure 8:
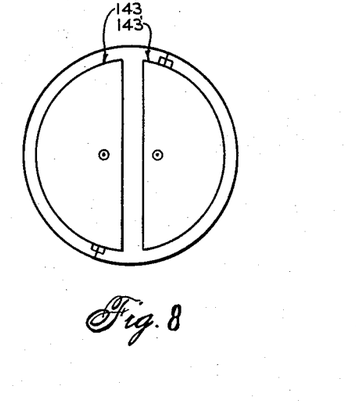
Figure 8 is a cross-sectional view of the detector shown in Figure 7 taken along the line 8—8 as indicated.

A further modification of that form of the invention illustrated in Figure 4 is shown in Figures 7 and 8. Figure 8 is a horizontal sectional view of Figure 7 taken along the line 21—21 as indicated. In these figures there are provided two ionization chambers 143 and 143' such as that illustrated in Figure 6. The disposition of ionization chambers 143 and 143' is such that each occupies one-half of the cross-sectional area of the housing 137 and is slanted in the same manner, as illustrated in Figure 6, but mutually opposite. It is to be understood that chamber 143' contains corresponding elements, as well as a source of potential.

The output from chambers 143 and 143' are fed to amplifiers 146 and 146', respectively. Each amplifier output is conducted, in the manner described in connection with Figure 4, to independent recording circuits where separate records are made.

The device of Figure 7 is sensitive to geographic orientation, and may be oriented by methods familiar in the art.

Figure 9:
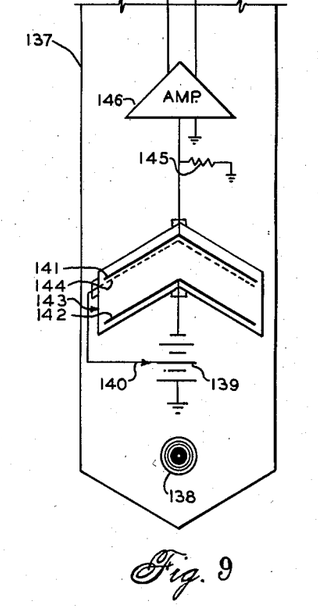
Figure 9 illustrates still another modification of the detector shown in Figure 4.

Determination of the vertical dip of strata crossing a bore hole may be made by measuring the angle at which the strata cross the bore hole. It is to be understood that this measurement has to be corrected by deviations from vertical for the drill hole, which may be determined by methods well known in the art. The magnitude of the dihedral angle between the plane of the strata and the plane perpendicular to the axis of the bore hole may be determined by observing, on an enlarged depth scale, the exact depths at which two corresponding transitions between adjacent strata occur, and comparing these depths by subtracting them. It is understood that the instrument is so oriented that the above difference is maximum, and that such orientation has been measured, to indicate the direction of the dip. The angle of dip is then $$\theta = \mathrm{Tan}^{-1} \frac{\Delta}{W + 2p}$$

where

θ is the angle of dip
Δ is the above described measured difference of depth
p is the penetration, or average depth of investigation of the radiation detection process, out from the sides of the bore hole
W is the diameter of the bore hole Still another modification of the form of the invention, as illustrated in Figure 4, is illustrated in Figure 9. This modification differs from those described immediately above in that the ionization chamber and contained elements are given a conical form. There is employed in this modification a single ionization chamber. Generally speaking, the pointed portion of the chamber and contained elements point upwardly. In this modification, the same character references are used to denote parts corresponding to those described in connection with Figures 4 to 8.

This modification of an embodiment of the invention has the characteristic set forth in connection with Figures 4 to 8 inclusive, that it emphasizes, through its directional sensitivity, those fast neutrons which have been scattered from relatively heavy nuclei in the strata (not hydrogen) at favorable angles of scattering. The directional sensitivity of the device of Figure 9 is such that it preferentially observes fast neutrons of maximum energy coming in on a cone having the same apical angle as the apical angle of the conical elements of the chamber, a conical axis coincident with the axis of these elements, 141, 142, 144, and an apex vertically situated between elements 142 and 144. The advantage of the device of Figure 9 is that it has no orientation sensitivity, therefore it gives a representative sampling of the material adjacent to the bore hole in all geographic directions from its axis.

The use of a favorable apical angle, together with a correct placement of the source 138 with respect to the apex of the ionization chamber 143, gives better utilization of the neutrons, and greater sensitivity, because of the large number of neutrons scattered by nuclei of elements in the strata at the more favorable scatting angle thus observed.

Obviously, the sensitivity of all the detectors of fast neutrons illustrated in Figures 4 to 9 will be limited by their small internal volumes. This limitation may be overcome, while retaining the desired directional properties by repeating the elements of these radiation detectors, connected electrically in parallel, and with all the elements geometrically parallel.

We claim:

1. A method of specifically detecting hydrogenous material in underground formations which comprises irradiating the formations with a flux of fast neutrons, detecting in the close vicinity of the point of emission of fast neutrons only those neutrons of approximately maximum energy which have been returned to the well from the formations at an obtuse scattering angle, measuring the intensity of the returned neutrons relative to the intensity of neutrons similarly returned from a formation containing no hydrogen, and recording the measurement versus depth.

2. A method of detecting neutrons incident upon a detector from selected directions which comprises measuring the frequency of occurrence of recoil processes occurring in the detector that are collinear with the incident neutrons from the selected directions, the said collinear recoil processes being selected from all the recoil processes occurring in the detector in such a manner that the measured collinear processes are directed from the selected directions.

3. An apparatus for producing a neutron log of a well that comprises a source of fast neutrons, means for traversing the well with the source to effect bombardment of the formations with fast neutrons, means disposed adjacent said source and adapted for movement therewith for detecting fast neutrons which have been diffused by the formations and returned to the well, said detecting means comprising a shallow ionization chamber sensitive to direction of incident fast neutrons, means for recording signals resulting from said detection in correlation with the depth at which detection occurred, means for transmitting the signals from the detector to the recording means.

4. An apparatus for producing a neutron log of a well that comprises a source of fast neutrons, means for traversing the well with the source to effect bombardment of the formations with fast neutrons, means disposed adjacent said source and adapted for movement therewith for detecting fast neutrons which have been diffused by the formations and returned to the well, said detecting means comprising a shallow ionization chamber disposed at a substantial angle to the axis of the well, means for recording signals resulting from said detection in correlation with the depth at which detection occurred, means for transmitting the signals from the detector to the recording means.

5. An apparatus for producing a neutron log of a well that comprises a source of fast neutrons, means for traversing the well with the source to effect bombardment of the formations with fast neutrons, means disposed adjacent said source and adapted for movement therewith for detecting fast neutrons which have been diffused by the formations and returned to the well, said detecting means comprising a pair of shallow ionization chambers disposed at a substantial angle to the axis of the well but tilted oppositely, means for recording signals resulting from the separate detections in correlation with the depth at which the detections occurred, means for transmitting the signals from the detectors to the recording means.

6. An apparatus for producing a neutron log of a well that comprises a source of fast neutrons, means for traversing the well with the source to effect bombardment of the formations with fast neutrons, means disposed adjacent said source and adapted for movement therewith for detecting fast neutrons which have been diffused by the formations and returned to the well, said detecting means comprising a housing, an ionizable medium in said housing, substantially coaxial conical electrodes, having the same apical angle, disposed in vertically spaced relationship in the ionizable medium, means for recording signals resulting from said detection in correlation with the depth at which detection occurred, means for transmitting the signals from the detector to the recording means.

7. A method of detecting neutrons which comprises deriving small pulses from all incident neutrons making a large angle with a specified plane passing through the detector, producing generally larger pulses from neutrons incident upon the detector and directed generally parallel to the specified plane, amplifying said small pulses and said larger pulses, suppressing the small amplified pulses, and measuring the unsuppressed pulses as an indication of the number of neutrons having directions generally parallel to the said specified plane.

8. A method of neutron well logging that comprises the steps of irradiating the formations penetrated by the well with fast neutrons, detecting only neutrons which have entered the formations and returned to the well as a result of diffusion in the formations, said detection resulting from a collection of electrons produced by recoil particles resulting from collision between neutrons and atoms of the ionizable medium within the detector, the number of electrons collected following each collision being an index to the direction of the neutron which produces the process.

9. In a neutron well logging system having a source of fast neutrons and a detector of fast neutrons disposed for movement therewith through a borehole, an apparatus for selectively measuring fast neutrons diffused by the formations surrounding said borehole without having been diffused by hydrogen comprising a shallow impulse ionization chamber directionally sensitive to the incident fast neutrons, discriminating means for suppressing all but the larger pulses from said chamber, and means for measuring the rate of occurrence of the larger pulses.

10. In a neutron well logging system having a source of fast neutrons and a detector of fast neutrons disposed for movement therewith through a borehole, an apparatus for selectively measuring fast neutrons diffused by the formations surrounding said borehole without having been diffused by hydrogen comprising a shallow impulse ionization chamber directionally sensitive to the incident fast neutrons, discriminating means for suppressing all but the larger pulses from said chamber, and means for measuring the rate of occurrence of the larger pulses, said shallow ionization chamber comprising a confined ionizable gas having a major portion of atoms of atomic weight less than 5, at least two electrodes of substantially the same shape and size disposed in contact with said gas and separated by less than about one-seventh their least dimension transverse to their separation, and means for applying voltage between said electrodes to collect electrons produced in said gas.

11. A shallow ionization chamber comprising a confined ionizable gas having a major portion of atoms of atomic weight less than 5, at least two electrodes of substantially the same shape and size disposed in contact with said gas and separated by less than about one-seventh their least dimension transverse to their separation, and means for applying voltage between said electrodes to collect electrons produced in said gas.

References Cited in the file of this patent

UNITED STATES PATENTS

| | | |
|---|---|---|
| 2,302,247 | Neufeld | Nov. 17, 1942 |
| 2,308,361 | Fearon | Jan. 12, 1943 |
| 2,316,361 | Piety | Apr. 13, 1943 |
| 2,483,139 | Herzog | Sept. 27, 1949 |
| 2,575,769 | Rajchman et al. | Nov. 20, 1951 |
| 2,599,352 | Schneider | June 3, 1952 |
| 2,710,925 | McKay | June 14, 1955 |
| 2,735,953 | Tirico | Feb. 21, 1956 |
| 2,737,595 | Scherbatskoy | Mar. 6, 1956 |